UNITED STATES PATENT OFFICE.

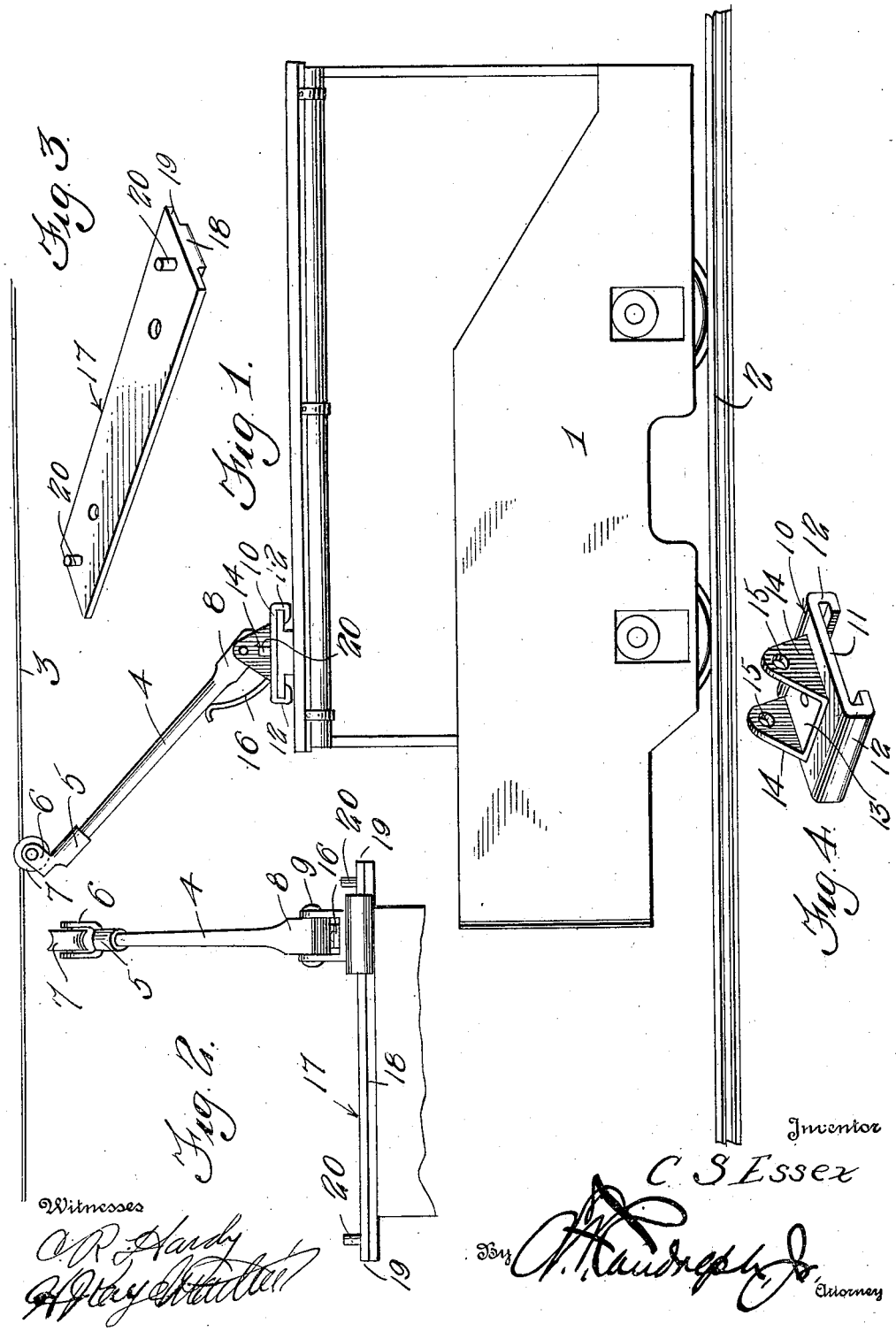

CHARLES S. ESSEX, OF POMEROY, OHIO.

TROLLEY-POLE.

1,369,796. Specification of Letters Patent. Patented Mar. 1, 1921.

Application filed May 2, 1917. Serial No. 165,914.

*To all whom it may concern:*

Be it known that I, CHARLES S. ESSEX, a citizen of the United States, residing at Pomeroy, in the county of Meigs and State of Ohio, have invented certain new and useful Improvements in Trolley-Poles; and I do hereby declare the following to be a full, clear, and exact description of the invention, such as will enable others skilled in the art to which it appertains to make and use the same.

This invention relates to new and useful improvements in trolley poles for train locomotives and the principal object of the invention is to provide a device which will eliminate the necessity of using more than one trolley pole.

A further object of the invention is to provide a novel mounting for the trolley pole which will securely hold the same against accidental movement and yet allow for the free shifting movement of the same laterally of the car.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters designate like and correspondnig parts throughout the several views, and in which—

Figure 1 is a side elevation of a mine locomotive showing said trolley pole attached thereto, Fig. 2 is a fragmentary end elevation of the car showing the trolley pole mounted thereon, Fig. 3 is a detail perspective view of the guide on which the trolley pole is mounted, and Fig. 4 is a detail perspective view of the sliding carriage carrying the trolley pole.

Referring to the drawing, the numeral 1 designates an ordinary electric locomotive used for mining purposes which runs on the usual track 2 and the numeral 3 designates the ordinary trolley wire for furnishing power for the driving of the locomotive.

The trolley pole is designated by the numeral 4 and is provided at its upper end with a sleeve 5 formed with a pair of upwardly extending ears 6 between which the trolley wheel 7 is rotatably mounted. The lower end of the pole 4 is enlarged as at 8 and is provided with an aperture for the reception of a pivot bolt 9 mounted in a yoke which is attached to the carriage as will be hereinafter more fully described.

The carriage above referred to is designated by the numeral 10 and comprises a plate 11 formed at its side edges with guide flanges 12 and riveted or otherwise attached as at 13 near the upper side of the plate 11 is a U-shaped yoke 14 which is apertured as at 15 to receive the bolt 9, in order to pivotally connect the trolley pole to the carriage. It will be understood that any suitable spring structure 16 may be attached to the yoke in such a manner as to hold the trolley pole up against the wires.

The yoke above referred to is slidable on the guide, designated generally by the numeral 17, which comprises a plate 18 formed at its side edges with reduced flanges 19 which flanges are spaced upwardly as illustrated in Figs. 1 and 3 so as to accommodate the lower portion of the guide flanges 12 which are bent around the flanges 19 and thus slidably mounts the carriage on the guide. Attached to the plate 18 and extending upwardly therefrom near the opposite ends are stop pins 20 which limit the lateral movement of the carriage on the guide as will be clearly seen upon reference to the drawing.

It will be understood that the carriage may be attached to the top of the car as illustrated in Fig. 1.

It will be apparent from the foregoing that in use when the car is traveling along and the trolley wire is to one side of the track, the trolley may be shifted to the proper position to receive the wire and when the car enters another part of the mine where the trolley wire is on the opposite side of the track, the trolley pole may be shifted to the opposite side of the car, thus avoiding the necessity of using more than one trolley pole.

From the foregoing description taken in connection with the accompanying drawings the advantages of construction and of the method of operation of the improved trolley pole will be readily apparent to those skilled in the art to which this invention appertains and, while in the foregoing description the principle of the operation of this invention has been described together with various features of construction, it is to be understood that certain minor features of construction, combination and arrangement of parts may be altered to suit practical conditions provided such alterations are comprehended within the scope of what is claimed.

What is claimed is:—

A trolley pole comprising a supporting plate secured to a locomotive and having the opposite edges of one face cut away to define horizontally extending flanges and forming spaces between themselves and the locomotive, a sliding plate resting on said supporting plate and extending transversely thereof and having its ends bent to engage the edges of said first named flanges, said second named flanges having their ends bent horizontally to underlie the first named flanges, a yoke secured to said sliding plate, and a pole pivoted to the yoke.

In testimony whereof I affix my signature in presence of two witnesses.

CHARLES S. ESSEX.

Witnesses:
E. K. TITUS.
J. R. ELDER.